United States Patent [19]
Ito et al.

[11] Patent Number: 5,650,698
[45] Date of Patent: Jul. 22, 1997

[54] POWER WINDOW APPARATUS WITH A SAFETY DEVICE FOR A MOTOR VEHICLE

[75] Inventors: Takeshi Ito; Satoru Sekiguchi; Masaru Kato, all of Yokohama, Japan

[73] Assignee: Jidosha Denki Kogyo Kabushiki Kaisha, Yokohama, Japan

[21] Appl. No.: 400,590

[22] Filed: Mar. 8, 1995

[51] Int. Cl.⁶ .................................................. H02P 3/00
[52] U.S. Cl. .............................. 318/282; 318/466; 49/28
[58] Field of Search ........................... 318/280–286, 318/466–470; 49/26, 28, 138; 160/291, 292, 293.1

[56] References Cited

U.S. PATENT DOCUMENTS

| | | | |
|---|---|---|---|
| 4,585,981 | 4/1986 | Zintler | 318/282 X |
| 4,657,586 | 4/1987 | Eigner et al. | 318/286 X |
| 4,965,502 | 10/1990 | Ogasawara | 318/286 X |
| 5,436,539 | 7/1995 | Wrenbeck et al. | 318/467 X |
| 5,459,379 | 10/1995 | Takeda et al. | 318/469 |

*Primary Examiner*—Jonathan Wysocki
*Attorney, Agent, or Firm*—Sughrue, Mion, Zinn, Macpeak & Seas

[57] ABSTRACT

The window glass of the power window apparatus is controlled so as to be returned in the opening direction as much as a predetermined distance of, for example, 2 mm or so when the closing operation of the window switch is discontinued while the window glass is moving toward the full-closed position in a turning area predetermined within the movable range of the window glass excepting the full-closed position of the window glass.

3 Claims, 5 Drawing Sheets

POWER WINDOW APPARATUS WITH A SAFETY DEVICE FOR A MOTOR VEHICLE

BACKGROUND OF THE INVENTION

1. Field of the Invention

This invention relates to a power window apparatus used for automatically raising and lowering a window glass of motor vehicles and a control method for the power window apparatus, and more particularly to improvement in the safety of the power window apparatus in a case of pinching a part of passenger's body such as a finger, a hand, an arm and so on between the window glass and the window frame.

2. Description of the Prior Art

In the conventional power window apparatus for automatically moving the window glass of the motor vehicle upwardly and downwardly, when the window switch is switched on toward the opening side in a manual mode, an electric current is supplied to the power window motor in the direction for lowering the window glass as long as the window switch is operated, and when the window switch is switched on toward the closing side in the manual mode, the electric current is supplied to the power window motor in the direction for raising the window glass as long as the window switch is operated.

The power window motor is provided with a rotation sensor, and the rotation sensor generates pulses according to the rotation of the motor shaft of the power window motor. The controller of the power window apparatus detects the present position of the window glass and load applied on the window glass on basis of the counting value and the pulse interval of the pulse signal generated from the rotation sensor.

If the pulse interval of the pulse signal generated from the rotation sensor becomes larger than a predetermined reference value and the counting value of the pulse signal indicates that the window glass is near to the full-closed position when the window glass is moving in the closing direction in response to the on-operation of the window switch on the closing side, the controller stops the window glass by cutting off the current supply to the power window motor according to the detection that the window glass reaches to the full-closed position. Additionally, if the pulse interval becomes larger than the reference value though the window glass does not reach at the full-closed position in this case, the controller detects that a finger, a hand of the passenger or the other thing is caught between the window glass and the window frame (hereinafter called as "pinching"), and returns the window glass in the opening direction from the closing direction by reversing the current direction supplied to the power window motor.

However, in the conventional power window apparatus having the aforementioned structure, it takes some time for detecting the pinching and returning the window glass in the opening direction. Therefore, if the window switch is switched off at the same time the finger or the like is caught by the window glass, namely before the controller detects the pinching and returns the window glass, the window glass stops at the state where the finger or the like is pinched between the window glass and the window frame. Accordingly, there is a problem since there is the possibility that the finger, the arm or the like pinched by the window glass may be injured.

SUMMARY OF THE INVENTION

This invention is made in view of the above mentioned problem of the prior art, and it is an object to provide a power window apparatus and a control method for the power window apparatus, which is improved on its safety and does not damage the pinched finger or the like even if the window switch is switched off when the finger or the like is caught between the window glass and the window frame.

The construction of the power window apparatus according to this invention for attaining the above mentioned object is characterized by comprising a window switch operable for selectively generating a manual opening command signal and a manual closing command signal, a window actuator having a reversible motor mechanically linked with a window glass of a motor vehicle for moving the window glass between full-closed position and full-opened position in the opening direction according to current supply in a first direction and in the closing direction according to current supply in a second direction, and a controller for supplying electric currents to the reversible motor of the window actuator in the first direction in response to the manual opening command signal generated from the window switch and in the, second direction in response to the manual command signal generated from the window switch, the controller supplies the electric current reversely to the reversible motor of the window actuator in the first direction when closing motion of the window glass based on the manual closing command signal is restrained in a turning area predetermined within a movable range of the window glass excepting the full-closed position, and supplies the electric current reversely to the reversible motor of the window actuator in the first direction during the window glass returns in the opening direction as much as a predetermined jogging distance when the manual closing command signal is discontinued before the closing motion of the window glass based on the manual closing command signal is restrained in the predetermined turning area.

In a power window apparatus according to an aspect of this invention, the controller may be provided with a restraint detector means for detecting the window glass to be restrained and generating a restraint signal, a position detector means for detecting the window glass to be within the predetermined turning area and generating a window detection signal, a jogging command means for generating a jogging command signal continuously until the window glass moves as much as the predetermined jogging distance, a closing command detector means for detecting the manual closing command signal output from the window switch to be discontinued and generating a closing command extinction signal, and a drive means for supplying the electric currents in the first and second directions to the reversible motor of the window actuator in response to the respective manual opening and manual closing command signals output from the wiper switch, further for supplying the electric current to the reversible motor of the window actuator reversely in the first direction in response to the window detection signal generated from the position detector means and the restraint signal generated from the restraint detector means, and supplying the electric current to the reversible motor reversely in the first direction in response to the window detection signal generated from the position detector means and the closing command extinction signal generated from the closing command detector means as long as the jogging command signal is generated from the jogging command means when the reversible motor of the window actuator is supplied with the electric current in the second direction according to the manual closing command signal generated by operating the window switch.

In a power window apparatus according to another aspect of this invention, the window actuator may be provided with a rotation detector means for generating a pulse signal according to rotation of the reversible motor, and the controller may be provided with a speed variation detector means for detecting speed variation of the window glass on basis of the pulse signal generated from the rotation detector means of the window actuator, a restraint detector means for comparing the speed variation of the window glass detected by the speed variation detector means with a predetermined reference value of the speed variation and generating a restraint signal when the speed variation exceeds the reference value, a first pulse counter for counting pulse of the pulse signal generated from the rotation detector means in order to detect a present position of the window glass, a position detector means for detecting the window glass to be within the predetermined turning area by comparing a counting value of the first counter with predetermined positional reference value corresponding to the turning area and generating a window detection signal, a second pulse counter for counting the pulses of the pulse signal generated from the rotation detector means in order to detect the predetermined jogging distance of the window glass, a jogging command means for comparing a counting value of the second counter with a predetermined set value corresponding to the jogging distance and generating a jogging command signal continuously until the counting value of the second counter comes to the set value, a closing command detector means for detecting the manual closing command signal output from the window switch to be discontinued and generating a closing command extinction signal, a drive command means for generating a first drive signal according to the manual opening command signal output from the window switch and generating a second drive signal according to the manual closing command signal output from the window switch, further for generating the first drive signal instead of the second drive signal in response to the window detection signal generated from the position detector means and the restraint signal generated from the restraint detector means, and generating the first drive signal instead of the second drive signal in response to the window detection signal generated from the position detector means and the closing command extinction signal generated from the closing command detector means as long as the jogging command signal is generated from the jogging command means when the second drive signal is supplied to the drive means according to the manual closing command signal generated by operating the window switch, and a drive means for supplying the electric currents in the first and second directions to the reversible motor of the window actuator in response to the respective first and second drive signals generated from the drive command means.

The construction of the control method of the power window apparatus moving a window glass of a motor vehicle automatically between full-closed position and full-opened position in opening and closing directions in response to operation of a window switch is characterized by returning the window glass in the opening direction when closing motion of the window glass is restrained in a turning area predetermined within a movable range of the window glass excepting the full-closed position, and returning the window glass in the opening direction as much as a predetermined jogging distance when the closing operation of the window switch is discontinued before the closing motion of the window glass is restrained in the predetermined turning area.

In the control method of the power window apparatus according to this invention, the window glass is so controlled as to be returned in the opening direction as much as the predetermined jogging distance of, for example, 2 mm or so when the closing operation of the window switch is discontinued while the window glass is moving toward the full-closed position in the turning area predetermined within the movable range of the window glass excepting the full-closed position. Namely, the window glass is always returned as much as the jogging distance in the opening direction when the closing motion of the window glass is suspended at a position within the predetermined turning area, therefore the passenger's finger, arm or so is never damaged even if the window switch is switched off at the same time of occurrence of the "pinching".

The power window apparatus according to this invention is provided with the controller in addition to the window switch and the window actuator having the reversible motor, the controller has, for example, the restraint detector means for detecting the window glass to be restrained, the position detector means for detecting the position of the window glass, the jogging command means for detecting the window glass to move as much as the predetermined jogging distance, the closing command detector means for watching the manual closing command signal of the window switch and the drive means for supplying the electric current to the reversible motor of the window actuator in the first or second direction in response to signals generated from the above-mentioned restraint detector means, the position detector means, the jogging command means and the closing command detector means. Accordingly, the power window apparatus according to this invention is suitable to perform the aforementioned control.

DESCRIPTION OF THE PREFERRED EMBODIMENT

The power window apparatus and the control method of the power window apparatus according to an embodiment of this invention will be described below on basis of FIG. 1 to FIG. 4.

Figure 1:
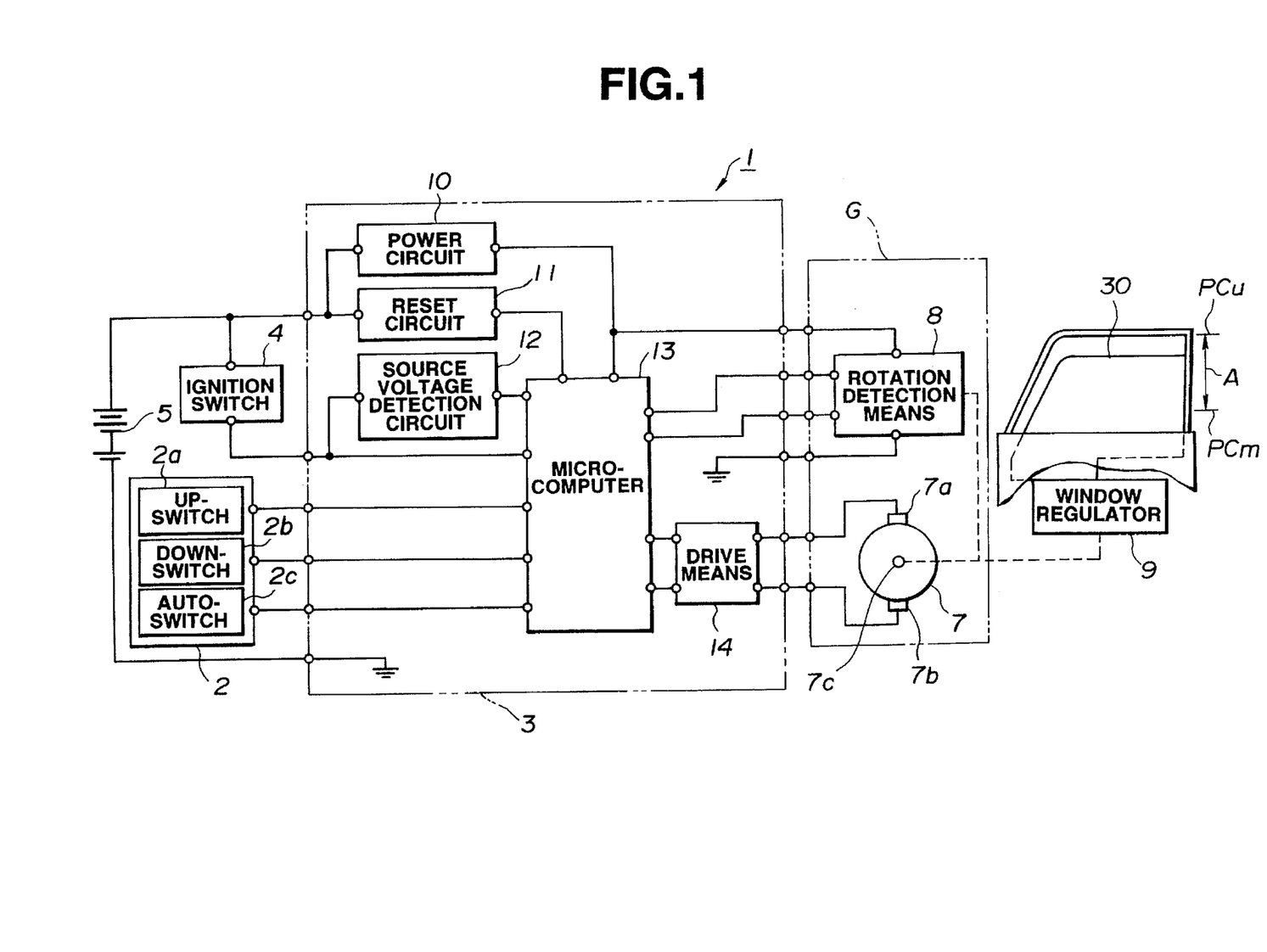
FIG. 1 is a block diagram showing the structure of the power window apparatus according to an embodiment of this invention.

In a power window apparatus 1 shown in FIG. 1, a window switch 2 is provided with an up-switch 2a, a down-switch 2b and auto-switch 2c, the window switch 2 generates a manual closing command signal only when the up-switch 2a is being operated on and supplies the manual closing command signal to a controller 3, and generates a manual opening command signal only when the down-switch 2b is being operated on and supplies the manual opening command signal to the controller 3. The window switch 2 is so designed as to generate the manual closing command signal continuously even after the off-operation of the up-switch 2a by operating on the auto-switch 2c together with the up-switch 2a and generate the manual opening command signal continuously even after the off-operation of the down-switch 2b by operating on the auto-switch 2c together with the downswitch 2b.

The window switch 2 is electrically connected to a controller 3, the controller 3 is electrically connected with a window actuator 6 together with an ignition switch 4 and a power source 5.

The window actuator 6 is provided with a reversible motor and a rotation detector means 8. Brush terminals 7a and 7b of the reversible motor 7 are connected to a drive means 14 (described later) housed in the controller 3, and the rotation detector means 8 is connected to a microcomputer 13 (described later) in the controller 3.

The drive means 14 of the controller 3 supplies an electric current to the motor 7 in the first direction (from the brush terminal 7a to another brush terminal 7b) in response to a first drive signal (downward drive signal) as described later, whereby an armature shaft 7c of the motor 7 rotates in the forward direction. The armature shaft 7c of the motor 7 is mechanically connected to a window glass 30 through a window regulator 9, and the forward rotation of the armature shaft 7c is converted into the downward motion of the window glass 30 through the window regulator 9, thereby moving the window glass 30 in the opening direction. Furthermore, the drive means 14 supplies an electric current to the motor 7 in the second direction (from the brush terminal 7b to the brush terminal 7a) in response to a second drive signal (upward drive signal), whereby the armature shaft 7c of the motor 7 rotates in the backward direction. The backward rotation of the armature shaft 7c is converted into the upward motion of the window glass 30 through the window regulator 9, thereby moving the window glass 30 in the closing direction.

The rotation detector means 8 generates a pulse signal on basis of the rotation of the armature shaft 7c of the motor 7, and the generated pulse signal is inputted into the microcomputer 13 of the controller 3.

The controller 3 is provided with a power circuit 10, a reset circuit 11, a source voltage detection circuit 12 in addition to the microcomputer 13 and the drive means 14.

The power circuit 10 is connected to the power source 5 at one side and connected to a power terminal of the microcomputer 13 at another side, and always supplies an electric current to a control element in the microcomputer 13.

The reset circuit 11 in the controller 3 is connected to the power source 5 at one side and connected to a reset terminal of the microcomputer 13 at another side, and has a function for resetting the microcomputer 13 into the initial state with every on-operation of the ignition switch 4.

The source voltage detection circuit 12 in the controller 3 is connected to the ignition switch 4 at one side and connected to a source voltage detection terminal of the microcomputer 13 at another side, and has a function for preventing the microcomputer 13 from an overcurrent caused by the on-operation of the ignition switch 4.

Figure 2:
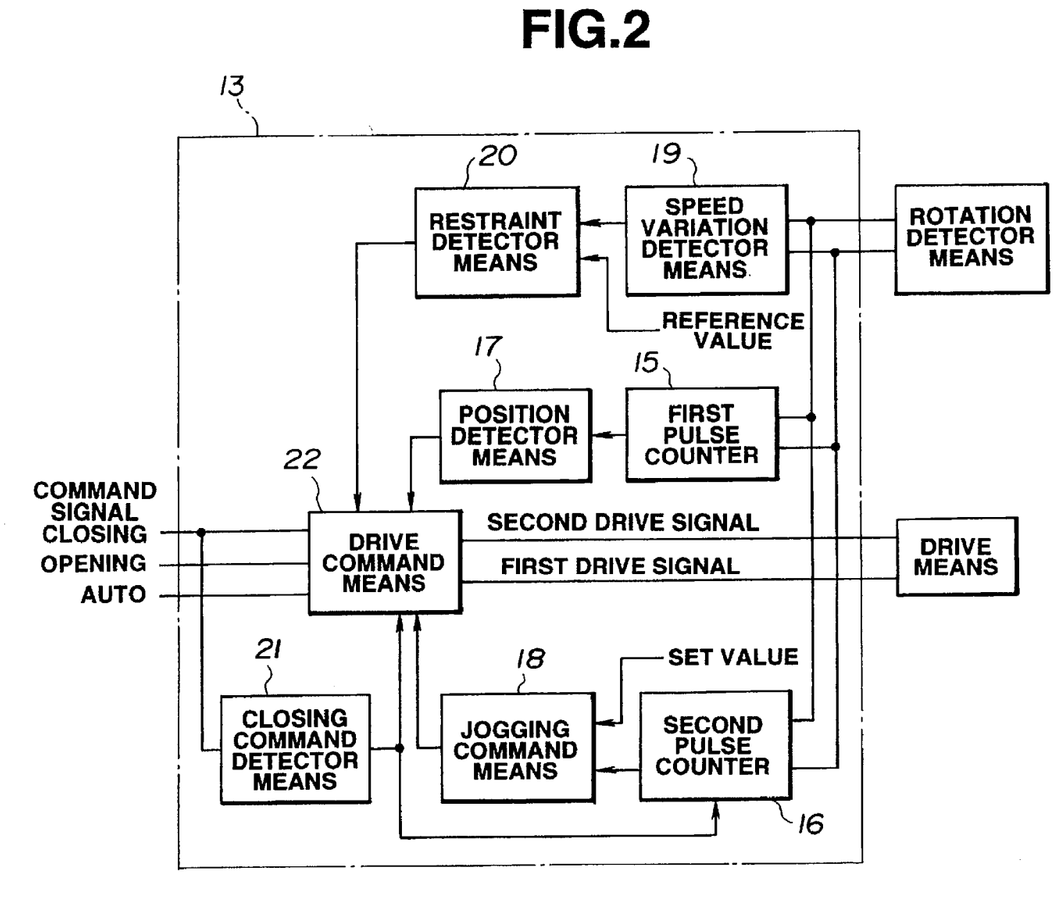
FIG. 2 is a block diagram illustrating the function of the microcomputer shown in FIG. 1.

The microcomputer 13 in the controller 3 is housed with a first pulse counter 15, a second pulse counter 16, a position detector means 17, a jogging command means 18, a speed variation detector means 19, a restraint detector means 20, a closing command detector means 21 and a drive command means 22 as shown in FIG. 2.

The first pulse counter 15 housed in the microcomputer 13 counts pulses of the pulse signal generated from the rotation detector means 8 of the window actuator 6 and stores the counting value in a predetermined RAM area of the microcomputer 13. The stored counting value is recognized by the position detector means 17 as described later. The first pulse counter 15 is reset in minimum counting value PC0 when the window glass 30 arrives at the full-closed position, and has maximum counting value PCn when the window glass 30 reaches to the full-opened position.

The position detector means 17 in the microcomputer 13 generates a window detection signal when the window glass 30 is in the predetermined turning area A as shown in FIG. 1. The turning area A is set in the position where the passenger's finger, arm and the like may be pinched the window glass 30.

Namely, the turning area A is predetermined at a range between the point slightly lower than the full-closed position of the window glass 30 corresponding to count reference value PCu of the first pulse counter 15 and the point near to the intermediate point between the full-closed and the full-opened positions of the window glass 30 corresponding to count reference value PCm of the first pulse counter 15, and the position detector means 17 is so designed as to detect the window glass 30 to be in the turning area A and to generate the window detection signal when the counting value PC1 of the first pulse counter 15 has a value between the count reference values PCu and PCm. The window detection signal generated from the position detector means 17 is supplied to the drive command means 22 as described later.

The second pulse counter 16 in the microcomputer 13 counts the pulses of the pulse signal generated from the rotation detector means 8 of the window actuator 6 and stores the counting value in a predetermined RAM area of the microcomputer 13. The second pulse counter 16 is so designed as to start the counting at the same time the closing command detection means 21 generates a closing command extinction signal as described later and to be reset in response to disappearance of the closing command extinction signal from the closing command detection means 21. The counting value PC2 counted by the second pulse counter 16 is supplied to the jogging command means 18.

The jogging command means 18 in the microcomputer 13 compares the counting value PC2 by the second pulse counter 16 with a predetermined set value (PCj) that is stored in ROM area of the microcomputer 13 and equal to the number of pulses corresponding to a predetermined jogging distance of the window glass 30 (2 mm in this embodiment) and generates a jogging command signal continuously until the counting value PC2 of the second pulse counter 16 amounts to the set value PCj. The jogging command signal generated from the jogging command means 18 is supplied to the drive command means 22.

The speed variation detector means 19 in the microcomputer 13 calculates speed variation of the window glass 30 according to the variation of the pulse interval of the pulse signal generated from the rotation detector means 8 of the window actuator 6. The speed variation value obtained by the speed variation detector means 19 is recognized by the restraint detector means 20 described below.

The restraint detector means 20 in the microcomputer 13 compares the speed variation value obtained by the speed variation detector means 19 with a predetermined reference value of the speed variation stored in ROM area of the microcomputer 13 and generates a restraint signal by detecting the window glass 30 to be restrained if the speed variation value exceeds the reference value. The restraint signal generated from the restraint detector means 20 is supplied to the drive command means 22.

The closing command detector means 21 in the microcomputer 13 watches the manual closing command signal output from the window switch 2 and generates the closing command extinction signal when the manual closing command signal from the window switch 2 is discontinued. The closing command extinction signal generated from the closing command detector means 21 is supplied to the drive command means 22.

The drive command means 22 in the microcomputer 13 recognizes the opening operation of the window switch 2, generates the first drive signal (downward drive signal) and supplies the first drive signal to the drive means 14 when the manual opening command signal is generated from the window switch 2, and the drive command means 22 recognizes the closing operation of the window switch 2, generates the second drive signal (upward drive signal) and supplies the second drive signal to the drive means 14 when the manual closing command signal is generated from the window switch 2. In this time, when the auto-switch 2c of the window switch 2 is being switched on, the first and the second drive signals are supplied continuously even if the down-switch 2b and the up-switch 2a are switched off.

Furthermore, the drive command means 22 is so designed as to supply the first drive signal (downward drive signal) instead of the second drive signal (upward drive signal) to the drive means 14 until the counting value of the first pulse counter 15 amounts to a predetermined count reference value PCr corresponding to a predetermined stopping position of the window glass 30 in response to the restraint signal generated from the restraint detector means 20 when the window detection signal is being generated from the position detector means 17, and so designed as to supply the first drive signal (downward drive signal ) instead of the second drive signal (upward drive signal) to the drive means 14 as long as the jogging command signal is generated from the jogging command means 18 in response to the closing command extinction signal generated from the closing command detector means 21 when the window detection signal is being generated from the position detector means 17.

The drive means 14 in the controller 3, which is a switching device such as a relay, is connected to output terminals of the microcomputer 13 and supplies the electric current to the reversible motor 7 provided to the window actuator 6 in the first direction (from the brush terminal 7a to the brush terminal 7b of the motor 7) according to the first drive signal (downward drive signal) generated from the drive command means 22 in the microcomputer 13 through the output terminals of the microcomputer 13, and supplies the electric current to the reversible motor 7 of the window actuator 6 in the second direction (from the brush terminal 7b to the brush terminal 7a of the motor 7) according to the second drive signal (downward drive signal) generated from the drive command means 22 in the microcomputer 13 through the output terminals.

Figure 3A:
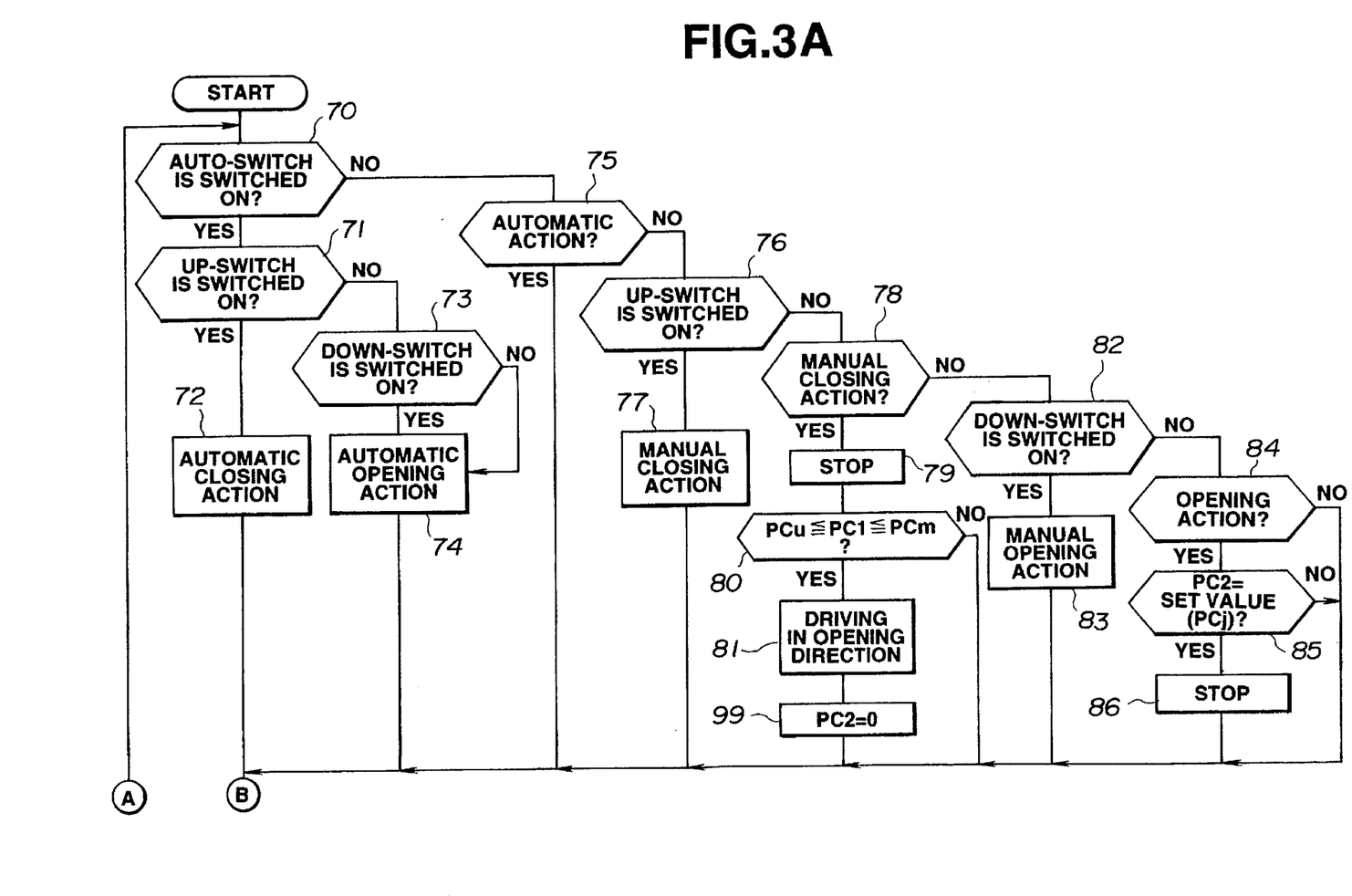
FIGS. 3A, 3B and 4 are flow-charts illustrating the control program in the power window apparatus shown in FIG. 1.
Figure 3B:
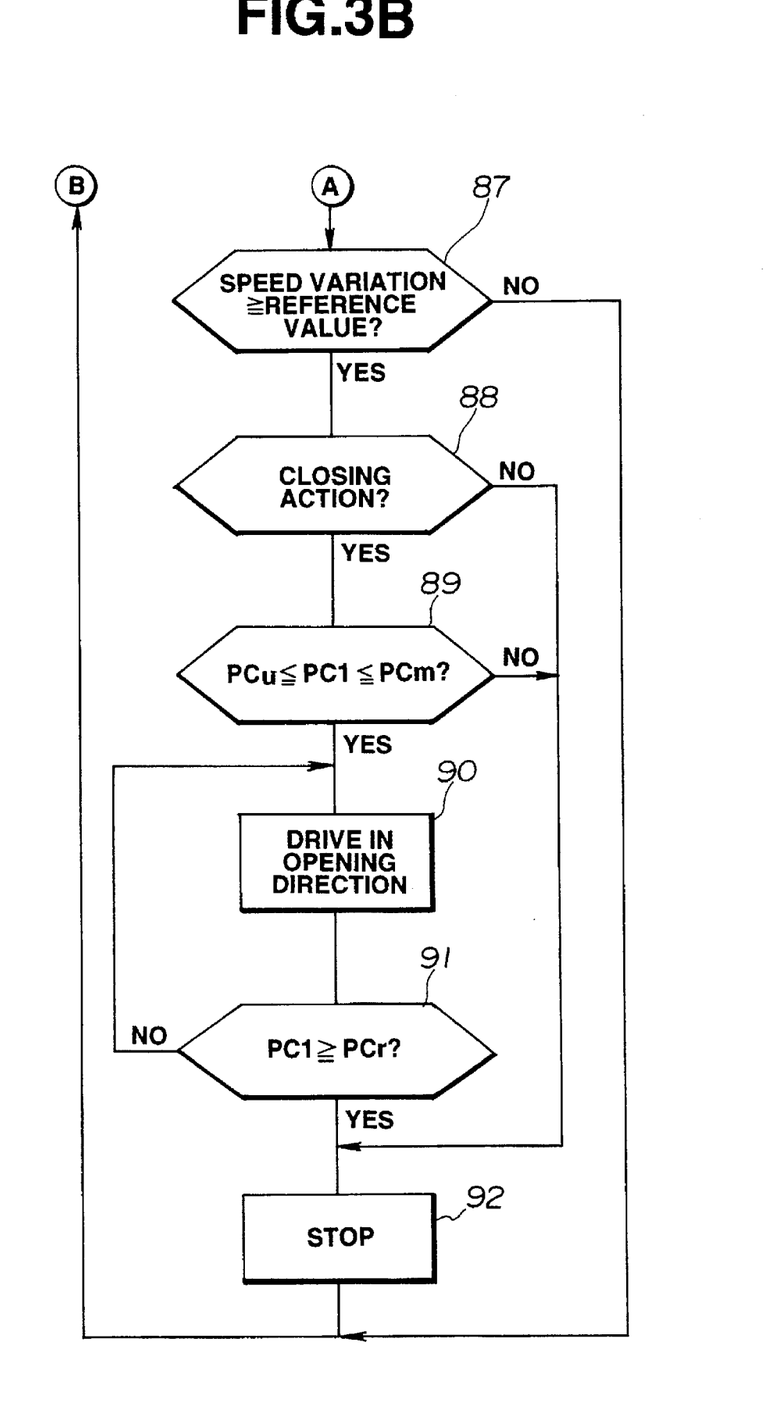
Figure 4:
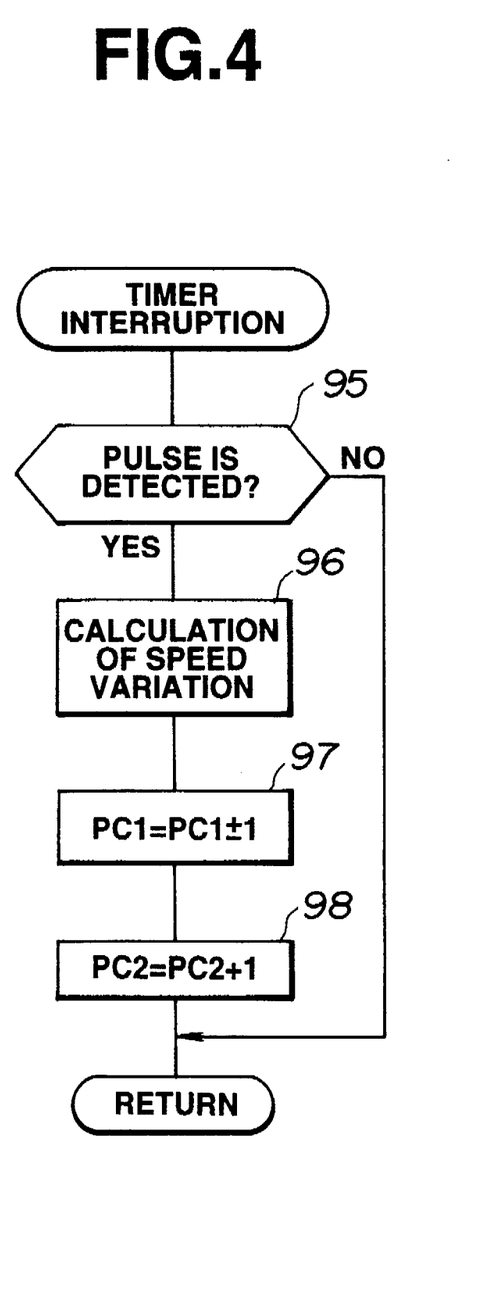

In the power window apparatus 1 having the structure as mentioned above, control is performed as shown in FIGS. 3A, 3B and 4. FIG. 4 shows interrupt routine to be performed for sampling the pulse signal at the same time the main routine shown in FIGS. 3A and 3B is executed.

The controller 3 of the power window apparatus 1 becomes the standby-state by switching on the ignition switch 4 when the window glass 30 arrives to the full-closed position, for example.

When the auto-switch 2c of the window switch 2 is switched on together with the down-switch 2b, determination is done to be "YES" at stop 70 and the control proceeds to step 73 after determination is done to be "NO" at step 71. After determining the down-switch 2b to be switch on (YES) at step 73 automatic opening action is executed at step 74 and the control proceeds to step 87. In ordinary case, determination is done at step 87 that the speed variation value obtained by the speed variation detector means 19 does not exceed the predetermined reference value of the speed variation, the control returns to step 70 and the aforementioned routine is performed repeatedly.

In this time, the automatic opening action is performed at step 74 and the first drive signal (downward drive signal) is supplied continuously to the drive means 14 by the drive command means 22 in the microcomputer 13, whereby the reversible motor 7 of the window actuator 6 is supplied continuously with the electric current in the first direction (toward the brush terminal 7b from the brush terminal 7a of the motor 7), the armature shaft 7c of the motor 7 rotates in the forward direction and the window glass 30 is actuated in the opening direction through the window regulator 9.

When such the routine is started, the timer interrupt routine show in FIG. 4 is started with every routine.

Namely, when the pulse signal is generated from the rotation detector means 8 of the window actuator 6 at step 95, the variation of the travel speed of the window glass 30 is calculated by sampling the pulse interval of the pulse signal by the speed variation detector means 19 at step 96. At step 97, the counting value PC1 of the first pulse counter 15 is renewed, that is the first pulse counter 15 is incremented by the forward rotation of the armature shaft 7c (opening direction) and decremented by the backward rotation (closing direction). The control proceeds to step 98 and the counting value PC2 of the second pulse counter 16 is incremented at step 98. The speed variation value of the window glass 30 is obtained every routine repeated.

When the window glass 30 arrives at the full-opened position, the window glass 30 is restrained to move, whereby the travel speed of the window glass 30 becomes lower. Accordingly, the speed variation value is determined to exceed the reference value (YES) at step 87 (in this time, the restraint signal is generated from the restraint detector means 20) and the control proceeds to step 92 after determination to be "NO" at step 88. At step 92, the first drive signal (downward drive signal) supplied to the drive means 14 from the drive command means 22 is interrupted and the control returns to step 70. The window actuator 6 stops the window glass 30 at the full-opened position according to the interruption of the current supply to the reversible motor 7.

If the auto-switch 2c of the window switch 2 is switched on together with the up-switch 2a when the window glass 30 is located in the full-opened position, determination is done to be "YES" at step 70 and the control proceeds to step 72 after determination to be "YES" at step 71. At step 72, automatic closing action is executed and the control proceeds to step 87. At step 87, determination is done that the speed variation value obtained by the speed variation detector means 19 does not exceed the predetermined reference value and the control returns to step 70 if there is not any abnormality.

In this time, the automatic closing action is performed at step 72 and the second drive signal (upward drive signal) is supplied continuously to the drive means 14 from the drive command means 22 in the microcomputer 13 and the reversible motor 7 of the wiper actuator 6 is supplied continuously with the electric current in the second direction (toward the brush terminal 7a from the brush terminal 7b of the motor 7), whereby the armature shaft 7c of the motor 7 rotates in the backward direction and the window glass 30 is actuated in the closing direction through the window regulator 9.

When the window glass 30 arrives at the full-closed position and strikes with the upper window frame of the vehicle body, the window glass 30 is restrained to move and the travel speed of the window glass 30 slows down. Therefore, the speed variation value is determined to exceed the reference value (YES) at step 87 (the restraint signal is generated from the restraint detector means 20) and the control proceeds to step 89 after determination is done to be "YES" at step 88.

At step 89, determination is done that the counting value PC1 of the first pulse counter 15 is lower than the count reference value PCu (NO) since the window glass 30 is not in the turning area A but situated at the full-closed position and the control proceeds to step 92. The second drive signal (upward drive signal) supplied to the drive mean 14 from the drive command means 22 is interrupted at step 92 and the control returns to step 70. The window actuator 6 stops the window glass 30 at the full-closed position on basis of the interruption of the current supply to the reversible motor 7.

If the down-switch 2b of the window switch 2 is switched on without operating the auto-switch 2c when the window glass 30 is situated at the full-closed position, determination is done to be "NO" at steps 70 and 75, and determination is done that the up-switch 2a is not operated (NO) at step 76 and then the control proceeds to step 82 after determination to be "NO" at step 78. The control proceeds to step 83 according to determination at step 82 that the down-switch 2b is switched on (YES) and manual opening action is executed at step 83. The control proceeds to step 87 and returns to step 70 after determination is done to be "NO" at step 87 when the window glass 30 is actuated smoothly without any abnormality.

Accordingly to the performance of the manual opening action at step 83, the motor 7 of the window actuator 6 is supplied with the electric current in the first direction from the drive mean 14 in response to the first drive signal output from the drive command means 22 in the microcomputer 13, whereby the armature shaft 7c of the motor 7 rotates in the forward direction and the window glass 30 is actuated in the opening direction, as mentioned above. In this time, the drive command means 22 generates the first drive signal (downward drive signal) as long as the down-switch 2b is switched on.

Furthermore, if the up-switch 2a of the window switch 2 is independently switched on without operating the auto-switch 2c when the window glass 30 is in the opened state, determination is done to be "NO" at steps 70 and 75, and the control proceeds to step 77 according to determination that the up-switch 2a is switched on (YES) at step 76. The control proceeds to step 87 after performing manual closing action at step 77 and returns to step 70 after determination is done to be "NO" at step 87 if the window glass 30 is actuated smoothly without any hindrance.

According to the performance of the manual closing action at step 77, the motor 7 of the window actuator 6 is supplied with the electric current in the second direction from the drive mean 14 in response to the second drive signal output from the drive command means 22, whereby the armature shaft 7c of the motor 7 rotates in the backward direction and the window glass 30 is actuated in the closing direction in the same manner as mentioned above. The drive command means 22 generates the second drive signal (upward drive signal) only when the up-switch 2a is being switched on.

In the case of occurence of the "pinching", namely if the passenger's finger, hand or the like is caught between the window glass 30 and the window frame when the window glass 30 is moving toward the full-closed position in the turning area A on basis of the on-operation of the up-switch 2a, the window glass 30 is restrained to move by the finger or so and the travel speed slows down. Accordingly, determination is done that the speed variation value is exceeds the reference value (YES) at step 87 (the restraint detection means 20 generates the restraint signal) and the control proceeds to step 89 after determination is done to be "YES" at step 88. At step 89, determination is done that the counting value PC1 of the first pulse counter 15 has a value between the count reference values PCu and PCm (YES) because the window glass 30 is within the turning are A (whereby, the position detector means 17 generates the window detection signal), the control proceeds to step 90 and driving is performed in the opening direction at step 90.

Namely, in the step 90, the drive command means 22 supplies the first drive signal (downward drive signal) instead of the second drive signal (upward drive signal) to the drive means 14 in response to the window detection signal generated from the position detector means 17 and the restraint signal generated from the restraint detector means 20, the drive means 14 supplies the electric current by changing over the current direction from the second direction to the first direction in response to the first drive signal and the armature shaft 7c of the motor 7 rotates in the forward direction, thereby actuating the window glass 30 in the opening direction.

The control proceeds to step 91, determination is done as to whether the window glass 30 reaches or not to the predetermined position by comparing the comparing the counting value PC1 of the first pulse counter 15 with the predetermined count reference value PCr at step 91 and the control proceeds to step 92 when the window glass 30 reaches to the predetermined position by repeating the steps 90 and 91 until the counting value PC1 of the first pulse counter 15 amounts to the count reference value PCr. At step 92, the first drive signal (downward drive signal) is interrupted by the drive command means 22 and the window glass 30 stops at the predetermined position.

In such a manner, the passenger's finger or the like becomes free from the window glass 30 and is not damaged.

Additionally, the aforementioned control routine comprising the steps 87 to 92 is also performed when the "pinching" occurs in the automatic closing action at the step 72.

Furthermore, when the window glass 30 arrives at the full-closed position according to the on-operation of the up-switch 2a, the window glass 30 stops at the full-closed position through the control at steps 87 88, 89 and 92 similarly to the case of the automatic closing action.

If the on-operation of the up-switch 2a is discontinued when the window glass 30 is moving toward the full-closed position in the turning area A according to the on-operation of the up-switch 2a of the window switch 2, (in this time, the closing command detector means 21 generates the closing command extinction signal) determination is done that the up-switch is not switched on (NO) at step 76 and the control proceeds to step 79 after determination to be "YES" at step 78. At step 79, the second drive signal (upward drive signal) from the drive command means 22 is cut off and determination is done as to whether the window glass 30 is in the turning area A or not at step 80. At step 80, determination is done that the counting value PC1 of the first pulse counter 15 has a value between the count reference values PCu and PCm (YES) because the window glass 30 is within the turning area A (the position detector means 17 generates to window detection signal), the control proceeds to step 81 and the driving in the opening direction is executed at step 81.

In the step 81, the drive command means 22 supplies the first drive signal (downward drive signal) to the drive means 14 in response to the window detection signal generated from the position detector means 17 and the closing command extinction signal generated from the closing command detector means 21, the drive means 14 supplies the electric current in the first direction in response to the first drive signal generated from the drive command means 22 and armature shaft 7c of the motor 7 rotates in the forward direction, thereby actuating the window glass 30 in the opening direction.

The control proceeds to step 99 after executing the step 81 and returns to step 70 through the step 87 (NO) after resetting the second pulse signal 16 a step 99. Next, the control proceeds to step 82 through step 70 (NO), step 75 (NO), step 76 (NO), and step 78 (NO). At step 82, determination is done that the down-switch 2b is not operated (NO), the control proceeds to step 84 and determination is done at step 84 as to whether the window glass 30 is being actuated in the opening direction or not, or whether the first drive signal (downward drive signal) is output or not from the drive command means 22. Namely, determination is done to be "YES" at step 84 and the control proceeds to step 85.

In the step 85, determination is done as to whether the window glass 30 moves as much as the predetermined jogging distance or not by comparing the counting value PC2 of the second pulse counter 16 with the predetermined set value PCj and the drive command means 22 supplies the first drive signal (downward drive signal) continuously to the drive means 14 until the counting value PC2 of the second pulse counter 16 amounts to the set value PCj (in this time, the jogging command means 18 generates the jogging command signal). The control proceed to step 86 and the first drive signal (downward drive signal) is interrupted by the drive command means 22 after determination is done that the counting value PC2 of the second pulse counter 16 amounts to the set value PCj at step 85. Consequently, the window glass 30 stops at the position shifted in the opening direction as much as the predetermined jogging distance from the position where the window glass 30 is located at the time of off-operation of the up-switch 2a of the window switch 2.

Accordingly, even if the on-operation of the up-switch 2a is discontinued at the same time the passenger's finger or the like is pinched between the window glass 30 and the window frame when the window glass 30 is moving toward the full-closed position according to the on-operation of the up-switch 2a, the passenger's finger or the like is not damaged because the window glass 30 always stops after moving some distance in the opening direction.

As mentioned above, in the power window apparatus and the control method of the power window apparatus according to this invention, it is possible to return always the window glass in the opening direction as much as predetermined jogging distance without stopping at the present position in the case of stopping the window glass in the turning area predetermined at a position where the passenger's finger or the like may be pinched by the window glass. Therefore, the window glass never stops in the pinching state even if the closing operation of the window switch is discontinued at the same time the passenger's finger or the like is pinched between the window glass and the window frame, and an excellent effect can be obtained in that the pinched finger or the like is never damaged and it is possible to improve the safety of the power window apparatus very availably.

What is claimed is:

1. A power window apparatus for a motor vehicle comprising:

a window actuator mechanically linked with a window glass of a motor vehicle, and having a reversible electric motor for moving the window glass between a full-closed position and a full-opened position thereof;

a manual switch operable for selectively generating opening and closing command signals for initiating movement of the window glass toward the full-opened position and the full-closed position, respectively; and a control means for receiving the opening and closing command signals generated from said manual switch, and for generating and supplying a first electric current to said motor of said window actuator in response to the opening command signal and for generating and supplying a second electric current to said motor of said window actuator in response to the closing command signal, wherein said controlling means includes a safety means having a closing command signal detecting means for detecting a discontinuity of the closing command signal to generate a closing command extinction signal, and a jogging signal generating means for generating a jogging signal with a predetermined set value in response to the closing command extinction signal generated from said detecting means;

wherein said controlling means generates the first electric current in response to the jogging signal generated from said jogging signal generating means of said safety means and supplies the first electric current to said motor of said window actuator for moving the window glass toward the full-opened position while receiving the jogging signal.

2. A power window apparatus as recited in claim 1, wherein said reversible electric motor of said window actuator includes rotation detecting means for detecting the rotation of a rotating shaft thereof to detect the moving distance of the window glass of the vehicle and for generating a pulse signal in response to the rotation of the rotating shaft of said motor, and said jogging signal generating means includes a pulse counter for counting the pulse signal generated from said rotation detecting means and a comparator which compares the counting value of said pulse counter to the predetermined set value of the jogging signal.

3. A power window apparatus for a motor vehicle comprising:

a window switch operable for selectively generating a manual opening command signal and a manual closing command signal;

a window actuator provided with a reversible electric motor mechanically linked with a window glass of a motor vehicle for moving the window glass between a full-closed position and a full-opened position in the opening direction according to current supply in a first direction and in the closing direction according to current supply in a second direction, and a rotation detector means for generating a pulse signal according to rotation of said reversible electric motor; and a controller provided with;

a speed variation detector means for detecting speed variation of the window glass on basis of the pulse signal generated from the rotation detector means of said window actuator;

a restraint detector means for comparing the speed variation of the window glass detected by said speed variation detector means with a predetermined reference value of the speed variation and generating a restraint signal when the speed variation exceeds said reference value;

a first pulse counter for counting pulses of the pulse signal generated from said rotation detector means in order to detect a present position of the window glass;

a position detector means for detecting the window glass to be in a turning area predetermined within a movable range of the window glass excepting said full-closed position by comparing a counting value of said first counter with predetermined positional reference values corresponding to the turning area and generating a window detection signal;

a second pulse counter for counting the pulses of the pulse signal generated from said rotation detector means in order to detect a predetermined jogging distance of the window glass;

a jogging command means for comparing a counting value of said second pulse counter with a predetermined set value corresponding to said jogging distance and generating a jogging command signal continuously until the counting value of the second pulse counter comes to said set value;

a closing command detector means for detecting the manual closing command signal output from said window switch to be discontinued and generating a closing command extinction signal;

a drive command means for generating a first drive signal according to the manual opening command signal output from the window switch and generating a second drive signal according to the manual closing command signal output from said window switch, further for generating the first drive signal instead of the second drive signal in response to the window detection signal generated from said position detector means and the restraint signal generated from said restraint detector means, and generating the first drive signal instead of the second drive signal in response to the window detection signal generated from said position detector means and the closing command extinction signal generated from said closing command detector means as long as the jogging command signal is generated from said jogging command means when the second drive signal is generated according to the manual closing command signal generated by operating said window switch; and a drive means for supplying the electric currents in the first and second directions to the reversible electric motor of said window actuator in response to the respective first and second drive signals generated from said drive command means.

* * * * *